INVENTORS
VIRGIL A. MINCH
JOHN T. EGAN
BY

ATTORNEYS

United States Patent Office 3,347,381
Patented Oct. 17, 1967

3,347,381
WASTE TREATMENT
Virgil A. Minch, Chillicothe, Ohio, and John T. Egan, Yardley, Pa., assignors to The Mead Corporation, Dayton, Ohio, a corporation of Ohio
Filed Aug. 26, 1966, Ser. No. 575,324
11 Claims. (Cl. 210—150)

ABSTRACT OF THE DISCLOSURE

Apparatus for treatment of wastes by aerobic bacterial action including trickling filter elements of fluted and non-fluted thermoplastic sheet material joined together at at least some areas of contact therebetween. The sheet material may be polyvinyl chloride and has hydrophilic surfaces with depressions therein to provide sites for the growth of aerobic bacteria.

---

This application is a continuation-in-part of co-pending application Ser. No. 450,241, filed Apr. 13, 1965, and now abandoned, which was, in turn, a continuation-in-part of application Ser. No. 54,538, filed Sept. 7, 1960, now abandoned.

The present invention relates to apparatus for treating sewage and industrial wastes and, more particularly, to the purification of pulp and paper mill wastes by the use of a novel media construction which promotes bacterial action and concomitantly changes the fine suspended and dissolved solids into substances which are not objectionable.

It is recognized that wastes resulting from the operation of pulp and paper mills have a large bio-chemical oxygen demand which, unless kept constantly satisfied, results in putrefactive products. And in order to meet the oxygen demand and avoid putrification, it is further recognized that the bacterial action or oxidation incident to aeration must be greatly increased.

Heretofore, various types of apparatus, filtering media and methods have been utilized in an effort to satisfactorily purify sewage and certain types of industrial wastes. For example, sewage or waste has been percolated through a bed of filter media generally made of rocks or tiles. Certain bacteria present in the wastes attach themselves to the filtering media, grow and, by using the oxygen in the air, oxidize the organic materials in the wastes whereby the bacteriological oxygen demand of the treated wastes is reduced. Such bacteria live and are active only in the presence of oxygen. Moreover, they have great powers of absorbing oxygen but must have an abundance of oxygen to continue functioning if desirable activation is maintained whereby the bacteriological oxygen demand of the treated wastes is so reduced as to permit these wastes to be discharged into a natural stream without greatly upsetting the biological balance of the stream.

Accordingly, the most satisfactory and highly desirable filtering media for sewage and industrial waste treatment provides sites for the aerobic bacteria to grow, aerates the waste and utilizes a light-weight construction which is not collapsible as the result of its intended use, and provides a relatively large bacteria surface growing area.

One of the objects of the present invention is to provide an improved cellular media for meeting the oxygen demand of sewage and industrial wastes and for promoting the reproduction and propagation of aerobic biological microscopic organisms.

Another object is to provide such a construction of light-weight media which is non-collapsible as a bio-oxidation media and has relatively large growing areas for the propagation of aerobic biological organisms.

A further object is to provide a comparatively light weight bio-oxidation media which provides an adequate and sustained supply of dissolved oxygen for the rapid and healthy growth and propagation of aerobic bacteria.

Still another object is to provide such a light weight media assembly for continuous biological treatment of organic matter, which media will not readily become clogged and inefficient through the copious growth and collection of aerobic organisms and/or precipitated matter.

A further object is to provide such a media and assembly which is inexpensive, easy to manufacture and is durable as well as long lasting.

Further objects and advantages will become apparent from the drawings and the following description.

Figure 1:
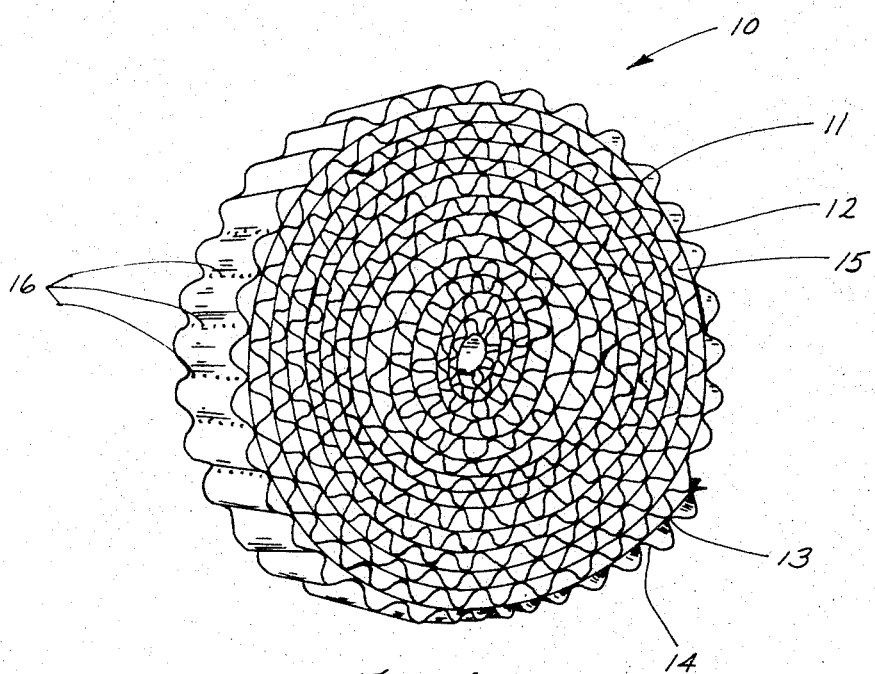
FIGURE 1 is a perspective view of a cylindrical bio-oxidation media embodying this invention.

In the embodiment shown in FIGURE 1, the invention comprises a cylindrical cellular type media construction generally designated by numeral 10. The media includes a continuous separator member 11 spirally wound upon itself and a continuous fluted member 12 spirally wound within the spaces between adjacent surfaces of separator member 11, and these members may be secured together in any suitable manner as by dielectric welding, by various adhesives or mechanically as by staple type fastening means. In the unit shown in FIGURE 1, vertices 13 of flute valleys 14 abut and are heat sealed as, for example, by dielectric welding as shown at 16 to adjacent surfaces of separator member 11 to provide an integral, structurally rigid columnar construction which, when compared with prior used construction, has been found to utilize engineering principles which provide maximum load carrying capacity for a specific thickness of material.

While any suitable material or combination of materials may be utilized in forming media construction 10, the embodiment illustrated in the drawings is a single faced corrugated structure in which separator member 11 and fluted member 12 are polyvinyl chloride. It has been found that polyvinyl chloride sheet material of a thickness of 0.018 inch is particularly suitable for this invention since it is light-weight, can be readily formed into a fluted construction by vacuum molding and may be readily provided with a relatively rough surface containing depressions to render it wettable and which provides sites for the aerobic bacteria to grow. Furthermore, it has been found that such polyvinyl chloride sheet material is sufficiently hydrophilic to permit ready attachment of bacteria colonies to sites on the relatively rough surface and also permits spreading of the waste fluids on the surface of the media.

In addition, relatively open channels 15 of the media of this invention permit the ready discharge of solid material, such as excess bacteria growth, which sloughs off the surface, thus providing freedom from clogging or plugging.

However, other formable sheets having the above mentioned properties as, for example, polyvinylidene chloride, are deemed to come within the scope of this invention.

Media 10 can be formed by a continuous line operation whereby preformed fluted member 12 is fed from a supply roll (not shown) and has the terminal end thereof secured to the terminal end of separator member 11 also fed from a supply roll (not shown). Thereafter, united separator member 11 and fluted member 12 are wound upon themselves with vertices 13 of flute valleys 14 being secured to adjacent surfaces of separator member 11 as the members are being rolled together or afterward, as desired, until the desired size of media 10 has been formed. Separator member 11 and fluted member 12 are then severed from the respective supply rolls whereby another media 10 can be formed in the same manner.

Therefore, it can be seen that media 10 can be easily manufactured from supplies of separator members 11 and fluted members 12 as desired and the size of the product can be easily controlled by merely stopping the manufacturing process at the desired time.

After the media 10 have been formed in the above member, one or more of the same may be combined together with other media of this invention or with prior known constructions to form packs whereby the waste to be treated passes through cellular channels 15 defined by flute valleys 14 and separator member 11. In this manner, the cellular media 10 of this invention provides a large surface area over which the waste will come into contact and on which the bacteria will grow and thus perform its function in a manner not previously attained with respect to purification of sewage and industrial wastes and particularly pulp and paper mill wastes.

Further, the cellular construction provides structural strength to media 10 whereby the same is relatively strong and can withstand compacting forces, separator member 11 and fluted member 12 extending throughout the entire width of media 10.

Figure 2:
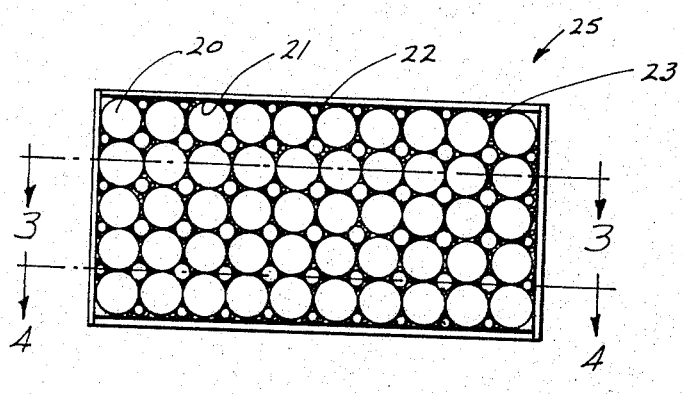
FIGURE 2 is a top plan view of such a media of this invention assembled within a rectangular housing to form a bio-oxidation structure.

FIGURE 2 shows a plurality of cylindrical tubular type media 20, 21, 22 of various sizes but of the general construction of media 10, assembled in a vertical stack within a rectangular housing or retainer member 23 to form a bio-oxidation bed generally indicated by numeral 25 which may be used alone or of which a plurality may be assembled and arranged to form a tiered structure. Cylindrical media 20, 21, 22 are arranged in housing 23 in the pattern illustrated in FIGURES 2, 3, 4, or in any other desired pattern, to substantially fill housing 23 and may be secured together and/or to housing 23 at abutting surfaces.

Figure 3:
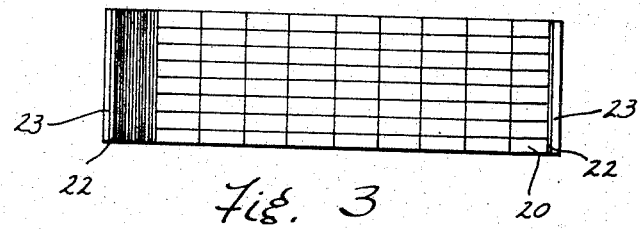
FIGURE 3 is a vertical sectional view on line 3—3 of FIGURE 2.
Figure 4:
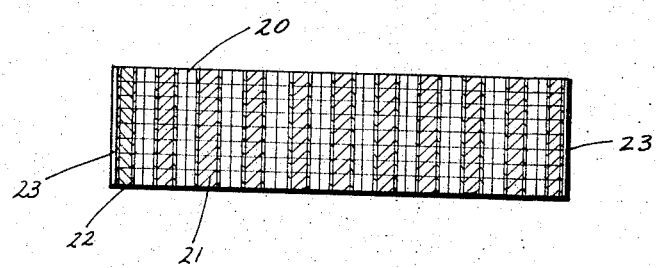
FIGURE 4 is a vertical sectional view on line 4—4 of FIGURE 2.

Housing member 23 and cylindrical media 20–22 may be formed of any like material or any combination of materials and, in the embodiment shown in FIGURES 2–4, housing member 23 and cylindrical elements 20–22 are formed of polyvinyl chloride or other suitable formable thermoplastic materials whereby the same are secured together by heat sealing and provide sites and a relatively large surface area for the promotion of the growth of aerobic bacteria.

Obviously, other geometrical forms of media may be assembled within housing member 23 to form bio-oxidation bed 25. For example, continuous separator member 11 can be wound rectangularly or squarely upon itself and continuous fluted member 12 rectangularly or squarely wound within the spaces between adjacent surfaces of separator member 11, to form square or rectangular media of various dimensions for assembly within housing or retainer member 23. And, if desired, bio-oxidation bed 25, whether housing cylindrical or parallelepiped type media, may be a superimposed multi-tiered structure to meet the demands of sizeable volume wastes.

Figure 5:
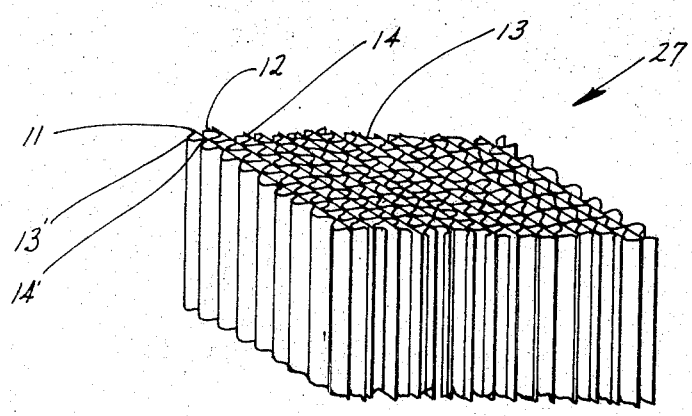
FIGURE 5 is a perspective view of a parallel piped type assembly embodying the elements of this invention.
Figure 6:
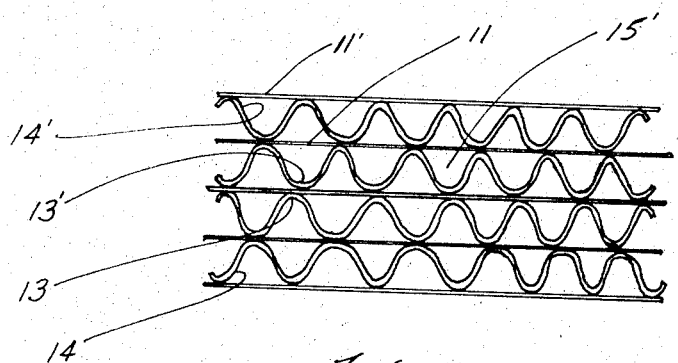
FIGURE 6 is a fragmentary top plan view of the assembly of FIGURE 5.

In the modification of FIGURES 5, 6, a parallelepiped type media 27 of this invention is shown. Media 27 is fabricated into a cellular structure comprising a plurality of cells by uniting a plurality of individual vertical single face corrugated segments consisting of separator member 11 and fluted members 12. Instead of winding united members 11 and 12 upon themselves to form bio-oxidation cells and media as described and shown in FIGURES 1–4, segments thereof are severed and positioned whereby vertices 13 of flute valleys 14 are brought into alignment and united with corresponding vertices 13' of flute valleys 14' as shown in FIGURE 6. Media 27 may, if desired, be banded or strapped together in any well known manner for readily providing a bio-oxidation bed and/or multi-tier bio-oxidation columns of any desired heighth.

Figures 7, 8:
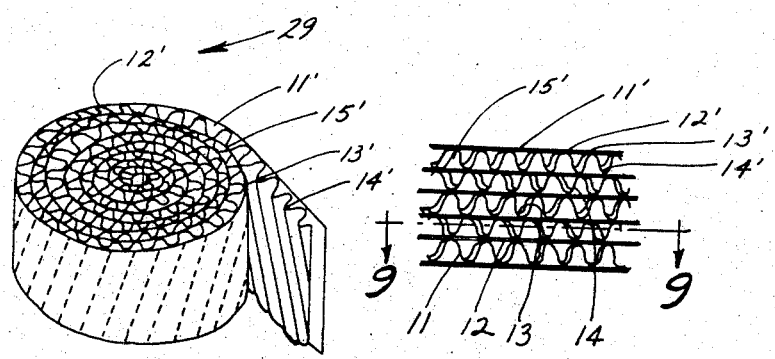
FIGURE 7 is a perspective view showing another embodiment of a cylindrical media of this invention in an intermediate stage of its production.
FIGURE 8 is a top plan view of the embodiment of FIGURE 7.
Figure 9:
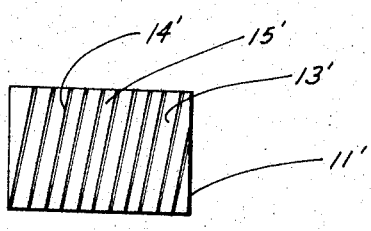
FIGURE 9 is a vertical sectional view along line 9—9 of FIGURE 8.

For the treatment of certain types of wastes, it may be desirable to modify the angle of fluted member 12' with respect to separator member 11' in order to avoid the possibility of free fall of liquid through channels 15'. In this connection, reference is made to FIGURES 7, 8, 9 which show fluted member 12' of cylindrical media 29 formed at an angle to the vertical axis of the construction previously described with respect to media 10, FIGURES 1, 2.

Figure 10:
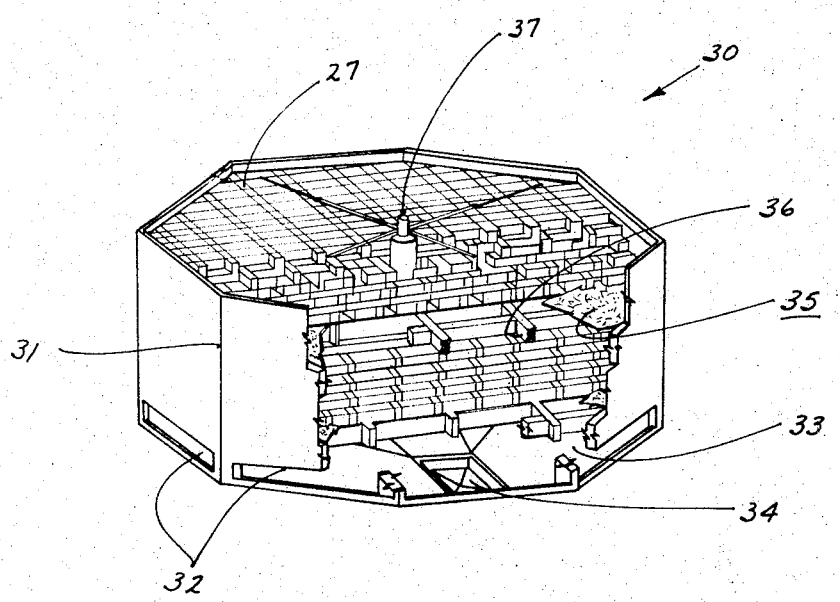
FIGURE 10 is a diagrammatic view partly broken away illustrating a tower containing multi-tiered layers of bio-oxidation media embodying the present invention.

In FIGURE 10, there is illustrated an embodiment of the invention wherein a plurality of media units are arranged in a multi-tiered layer arrangement within a natural draft tower, indicated generally at 30. Tower 30 is of any desired shape and comprises a plurality of side walls 31 having openings 32 adjacent the lower extremeties thereof. As illustrated in the drawing, tower 30 also includes a bottom 33 having an outlet opening 34 therein. The drawing is intended to be illustrative only and not limiting as various types of construction may be employed without departing from the invention. For example, side walls may be constructed of concrete block having openings 32 therein together with a suitable bottom and outlet opening 34 so that air carrying a supply of oxygen can circulate upwardly through the tower through open channels 15, 15', and pass outwardly through the open top of the tower. Alternatively, side walls 31 can be made of an asbestos-type cement-like material over a suitable steel framework.

A plurality of media units in accordance with the invention, media 27 being illustrated in FIGURE 10, are placed within tower walls 31 and rest upon suitable supports. For example, the support may include a grating 35 which is, in turn, supported by cross beams 36. Individual units 27 are arranged in side by side relation on the supporting structure and are confined by side walls 31. The individual units 27 thus form a bio-oxidation bed construction and are arranged in a plurality of tiers or layers to thus provide a multi-tier bio-oxidation column of desired heighth.

Thus, it will be seen that the open top of tower 30 is the inlet of the multi-tier bio-oxidation column to which the waste to be treated is supplied by a rotary distributor 37. Alternatively, if desired, fixed spray nozzles (not shown) may be employed to convey the waste material to be treated to the open top inlet of the tower. The waste material passes downwardly through the tower through channels 15, 15', and thereafter is conveyed to a desired location after passing out through outlet opening 34.

Accordingly, there has been provided bio-oxidation cellular media constructions that are strong, durable, easy to manufacture and which provide large surface areas for their bio-oxidation functions.

While the foregoing presents preferred embodiments of the present invention, it is obvious that other modifications and/or equivalents may be employed without departing from the scope of the invention, which is defined in the appended claims.

What is claimed is:

1. A bio-oxidation cell including channel means having surfaces for reducing the bacteriological oxygen demand of a fluent material during the presence thereof within said channel means, said channel means and said surfaces thereof being defined by flat and fluted elements of formable thermoplastic sheet material having hydrophilic surfaces having depressions therein to provide sites for the growth of aerobic bacteria joined together at areas of contact therebetween, and means for supplying aerobic bacteria including an inlet and a discharge opening for receiving and discharging oxygen-containing material and said fluent material to and from said channel means.

2. A bio-oxidation cell according to claim 1 wherein said flat and fluted elements are of polyvinyl chloride sheet material having hydrophilic surfaces having depressions therein to provide sites for the growth of aerobic bacteria.

3. Filter media comprising a plurality of bio-oxidation cells according to claim 2 wherein individual channel means thereof are defined by a plurality of spaced apart flat elements and said fluted elements are disposed within said spacing between adjacent flat elements with the flutes of said fluted members all extending in the same direction and being joined to adjacent surfaces of said flat elements at some areas of contact therebetween to form a unitary load-supporting structure of parallelepiper configuration.

4. A bio-oxidation bed construction comprising a plurality of filter media according to claim 3 wherein said individual filter media are arranged with their respective fluted members all extending parallel to each other, and additionally including housing means forming and retaining said plurality of media into a unitary structure.

5. Filter media comprising a plurality of bio-oxidation cells according to claim 1 wherein individual channel means thereof are defined by a wound separator member of formable thermoplastic sheet material having hydrophilic surfaces having depressions therein to provide sites for the growth of aerobic bacteria and having spacing between adjacent convolutions thereof and a wound fluted member of said formable thermoplastic sheet material disposed within said spacing between adjacent convolutions of said separator member, the flutes of said fluted member being joined to adjacent surfaces of said separator member at areas of contact therebetween to form a cylindrical unitary load-supporting structure.

6. Filter media comprising a plurality of bio-oxidation cells according to claim 5 wherein individual channel means thereof are defined by a wound separator member of said formable thermoplastic sheet material having spacing between adjacent convolutions thereof and a wound fluted member of said formable thermoplastic sheet material having hydrophilic surfaces having depressions therein to provide sites for the growth of aerobic bacteria and disposed within said spacing between adjacent convolutions of said separator member, the flutes of said fluted member being joined to adjacent surfaces of said separator member at areas of contact therebetween to form a cylindrical unitary load-supporting structure.

7. A bio-oxidation bed construction comprising a plurality of filter media according to claim 6 each having a longitudinal axis, said individual filter media being arranged with their respective axes disposed parallel to each other and wherein certain of said media have smaller diameters than the diameters of the remainder of said media, and additionally including housing means forming and retaining said plurality of media into a unitary structure.

8. A bed construction according to claim 7 wherein said media are disposed in multi-tiered layers.

9. Filter media comprising a plurality of bio-oxidation cells according to claim 1 wherein individual channel means are defined by flat separator members disposed between spaced apart fluted members of said formable thermoplastic sheet material having hydrophilic surfaces with depressions therein to provide sites for the growth of aerobic bacteria, the flutes of said fluted members being joined to said separator members at some area of contact therebetween to form a parallelepiped unitary load-supporting structure.

10. A bio-oxidation bed construction comprising a plurality of filter media according to claim 9 wherein said individual media are disposed with their respective channel means disposed parallel to each other, and additionally including housing means forming and retaining said plurality of media into a unitary structure.

11. Filter media according to claim 9 wherein said flat and said fluted members are polyvinylidene chloride.

References Cited
UNITED STATES PATENTS

| | | | |
|---|---|---|---|
| 2,115,577 | 4/1938 | Goldman | 210—494 |
| 2,183,657 | 12/1939 | Page | 210—150 X |
| 2,458,163 | 1/1949 | Hays | 210—18 |
| 2,477,040 | 7/1950 | Brown | 156—306 |
| 2,607,104 | 8/1952 | Foster | 161—137 X |
| 2,739,118 | 3/1956 | Carey | 210—150 X |
| 2,809,818 | 10/1957 | Munters | 261—24 |
| 2,809,933 | 10/1957 | Halvorson | 210—150 X |
| 2,986,379 | 5/1961 | Kramig | 261—28 |
| 3,081,987 | 3/1963 | Meek et al. | 261—112 |
| 3,084,918 | 4/1963 | Kohl et al. | |
| 3,113,102 | 12/1963 | Schulze | 210—150 |
| 3,265,550 | 8/1966 | Lindqvist | 261—112 X |

FOREIGN PATENTS

| | | |
|---|---|---|
| 209,309 | 12/1956 | Australia. |
| 667,362 | 6/1929 | France. |
| 303,773 | 1/1917 | Germany. |
| 9,228 | of 1911 | Great Britain. |
| 535,153 | 11/1940 | Great Britain. |

OTHER REFERENCES

The condensed Chemical Dictionary, 6th ed., Reinhold Pub. Corp., N.Y., copyright 1956, p. 921.

Egan et al.; Industrial Wastes, vol. 5, No. 4, August 1960, pp. 76–77.

Haim et al.; Welding of Plastics, Crosby Lockwood & Son., Ltd., 1947, tp. 986, A2H3, pp. 53, 119, 120, 143, and FIG. 33, the illustration between pp. 96–97.

Newsweek magazine, Apr. 2, 1962, pp. 44–45.

REUBEN FRIEDMAN, *Primary Examiner.*

D. M. RIESS, *Assistant Examiner.*